United States Patent
Carlson

(10) Patent No.: US 7,266,188 B2
(45) Date of Patent: Sep. 4, 2007

(54) APPARATUS AND METHOD FOR SECURING A CONFERENCE CALL VIA PERSONAL USER ID AND PASSCODE

(75) Inventor: Michael Pierre Carlson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 10/216,493

(22) Filed: Aug. 8, 2002

(65) Prior Publication Data

US 2004/0028200 A1    Feb. 12, 2004

(51) Int. Cl.
*H04M 3/42*    (2006.01)
(52) U.S. Cl. .............. 379/202.01; 379/207.13
(58) Field of Classification Search .......... 379/202.01, 379/203.01, 204.01, 205.01, 206.01, 207.01, 379/207.03, 207.1, 207.13, 190, 207.02, 379/158
See application file for complete search history.

(56) References Cited

U.S. PATENT DOCUMENTS

| | | | |
|---|---|---|---|
| 4,920,565 A | 4/1990 | Strawczynski et al. ........ 380/6 |
| 5,210,794 A | 5/1993 | Brunsgard ..................... 380/9 |
| 5,353,351 A | 10/1994 | Bartoli et al. ................. 380/33 |
| 5,450,481 A | 9/1995 | Penzias ....................... 379/202 |
| 5,959,662 A | 9/1999 | Shaffer et al. ................ 348/15 |
| 6,178,237 B1 * | 1/2001 | Horn ..................... 379/202.01 |
| 6,282,278 B1 | 8/2001 | Doganata et al. ........... 379/202 |
| 2001/0002927 A1 * | 6/2001 | Detampel, Jr. et al. |
| 2003/0161456 A1 * | 8/2003 | Brown et al. |
| 2003/0194072 A1 * | 10/2003 | MacNamara et al. |
| 2004/0010548 A1 * | 1/2004 | Hamilton, II et al. |

* cited by examiner

*Primary Examiner*—William J. Deane, Jr.
(74) *Attorney, Agent, or Firm*—David A. Mims, Jr.; Rudolf O. Siegesmund; Gordon & Rees, LLP

(57) ABSTRACT

The present invention is a method of providing security for a conference call. The invention identifies a conference call participant as opposed to identifying a caller's telephone. The invention allows the host to selectively include or exclude specific conference call participants. The additional security is accomplished through the use of two computer programs: a host program and a caller program. In the host program, each participant selects a personal user ID and passcode. The host then selects the conference call participants from a database and enters any participation restrictions. In the caller program, the callers call into the conference calling center and attempt to access the conference call. The caller is connected to the conference call only if he enters the correct conference call ID and passcode as well as his authorized user ID and passcode. The host may then restrict the participant as indicated in the host program.

40 Claims, 4 Drawing Sheets

APPARATUS AND METHOD FOR SECURING A CONFERENCE CALL VIA PERSONAL USER ID AND PASSCODE

FIELD OF THE INVENTION

The present invention relates to the field of security for telephone conference calls.

BACKGROUND OF THE INVENTION

Today's business people travelers have almost continuous access to either a cellular or a conventional telephone in any given stage of travel. The telephone is often the most convenient and efficient method of communication between the business travelers and their clients. Frequently, traveling business people also need to collaborate with the home organization and with clients, vendors, and business partners.

The conference call has become an increasingly popular tool among business people. However, as the popularity and use of conference calls has increased, so has the opportunity for unauthorized users to listen to a conference call. The prior art has disclosed a variety of devices which are designed to prevent unauthorized access to a conference call. These devices attach to a telephone and identify the telephone user as an authorized participant to a conference call. One problem with this approach is that the conference call participant must call from the telephone with the security device. Another problem with this approach is that there is no way to determine if the person using the security device is in fact the authorized participant. Moreover, the authorized participant may be excluded from the conference call if he attempts to connect to the conference call via his cellular telephone instead of his office telephone. Thus, the prior art only discloses security methods which are specific to a user's telephone or device rather than to the user himself. Therefore, a need exists for an apparatus and method of providing security to a conference call which is specific to a user instead of a user's telephone.

Additionally, those who use conference calls as a method of doing business are frequently hindered by the fact that they may need to confer privately with another participant during the conference call. This is frequently the case when an attorney, his client, another party, and the other party's attorney are all participating in a conference call. Another example is when an arbitration or mediation meeting is conducted via a conference call. Here it is useful for the arbitrator or mediator to exclude certain parties from a portion of the conference call in an attempt to broker an agreement between a plurality of parties. As there is currently no method for limiting the parties to a conference call as such, a need exists for a method of selectively excluding conference call participants from a conference call.

SUMMARY OF THE INVENTION

The present invention is a method of providing security for a conference call. The invention identifies a particular participant to a conference call as opposed to identifying a particular caller's telephone. The invention also allows the host to selectively include or exclude specific conference call participants from a conference call. The additional security is accomplished through the use of two computer programs: a host program and a caller program. In the host program, each participant selects a personal user ID and passcode. The host then selects the conference call participants from the conference call center database and enters any participation restrictions. In the caller program, the callers call into the conference calling center and attempt to access the conference call. The caller is connected to the conference call only if he enters the correct conference call ID and passcode as well as his authorized user ID and passcode. The host may then restrict the participant as indicated in the host program.

DETAILED DESCRIPTION OF THE PREFERRED EMBODIMENT

As used herein, the term "conference call" means a gathering of people for communicative purposes. Most conference calls involve a third party conference calling center which issues a telephone number and passcode to all the conference call participants (the host and the callers). The participants call the telephone number at the appropriate time, enter the passcode, and the conference calling center connects the participants. As used herein, the term "host" means the leader of a conference call. The host is usually the person who decides the date, time, and other details of the conference call, but is not limited as such. As used herein, the term "participant" means a person who is involved in a conference call. The host will always be one of the participants of a conference call. As used herein, the term "caller" means a person who is trying to gain access to a conference call. A caller will become a participant when he gains access to the conference call. As used herein, the term "conference call center" means a third party who allows the participants of a conference call to be connected to one another. Conference call centers typically have an automated menu for setting up and connecting to a conference call. The present invention is an improvement on the automated menu.

Figure 1:
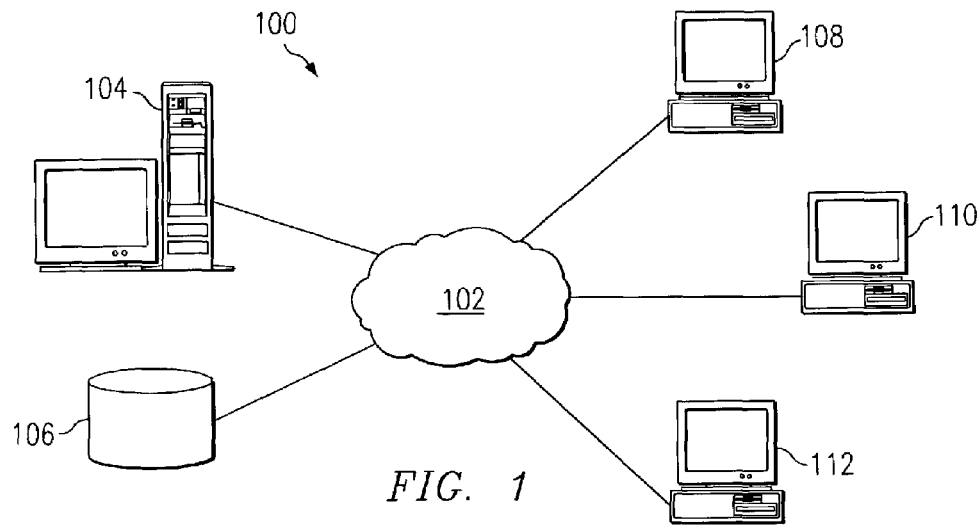
FIG. 1 is an illustration of a distributed data network.

FIG. 1 depicts a pictorial representation of a distributed data processing system in which the present invention may be implemented and is intended as an example, and not as an architectural limitation for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
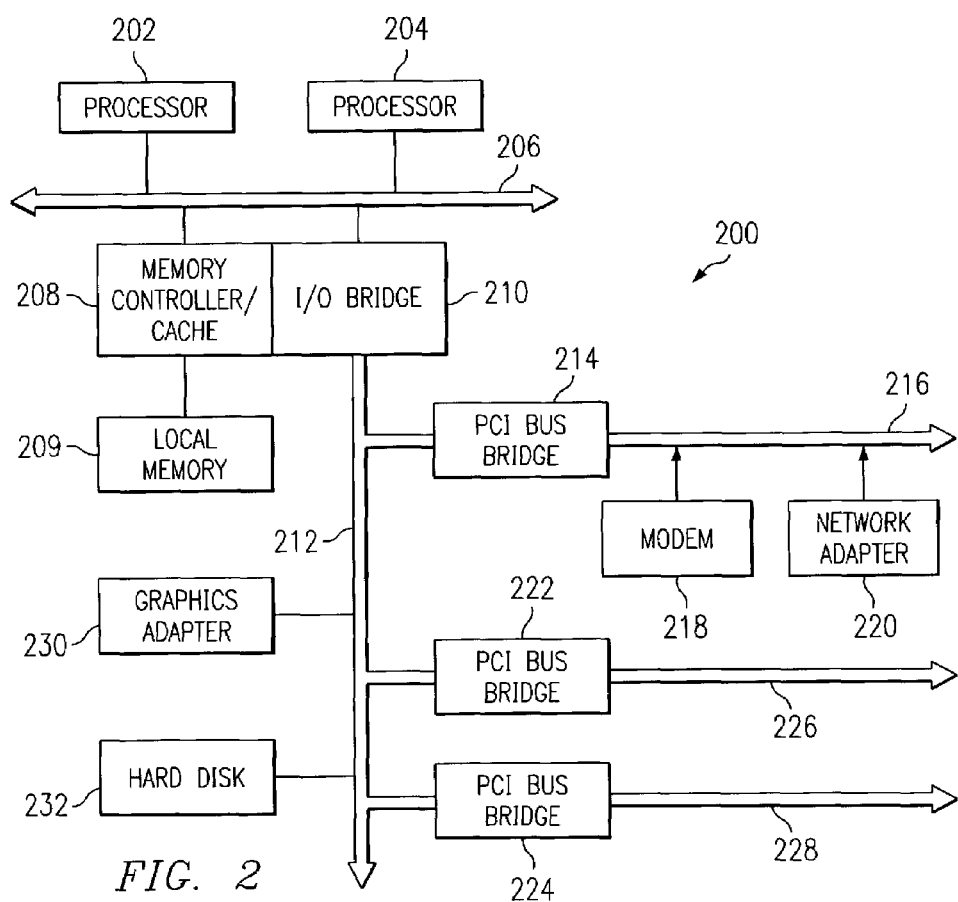
FIG. 2 is an illustration of a data processing system.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
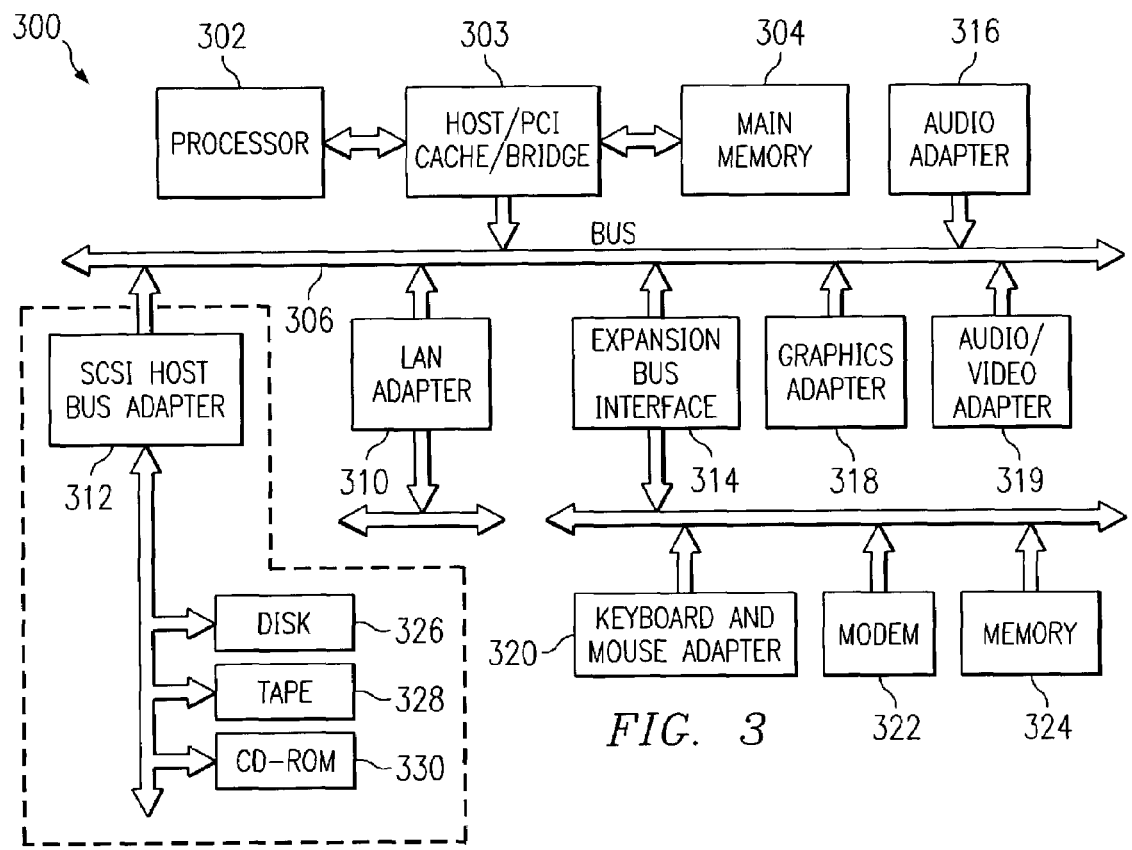
FIG. 3 is an illustration of a data processing system.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such as a floppy disc, a hard disk drive, a RAM, and CD-ROMs, and transmission-type media, such as digital and analog communications links.

Modern telecommunications systems are almost inseparable from their computer components and the Internet. Accordingly, those skilled in the art are aware of how to configure a conference calling center's automated system with additional components such as the programs contained within the present invention.

In entering information into host program 400 or caller program 500, the information may be entered by speaking into the handset of a telephone, entered via the touchpad of a telephone, entered over the Internet, or by any other data entry method. Those skilled in the art are aware of how to configure a computer to receive information over the Internet. Those skilled in the art are also aware of how to configure a telephone system to accept user input via telephone keypads and audible voice signals. Furthermore, the steps embodied in host program 400 and caller program 500 are not necessarily limited to the order as presented herein.

Figure 4:
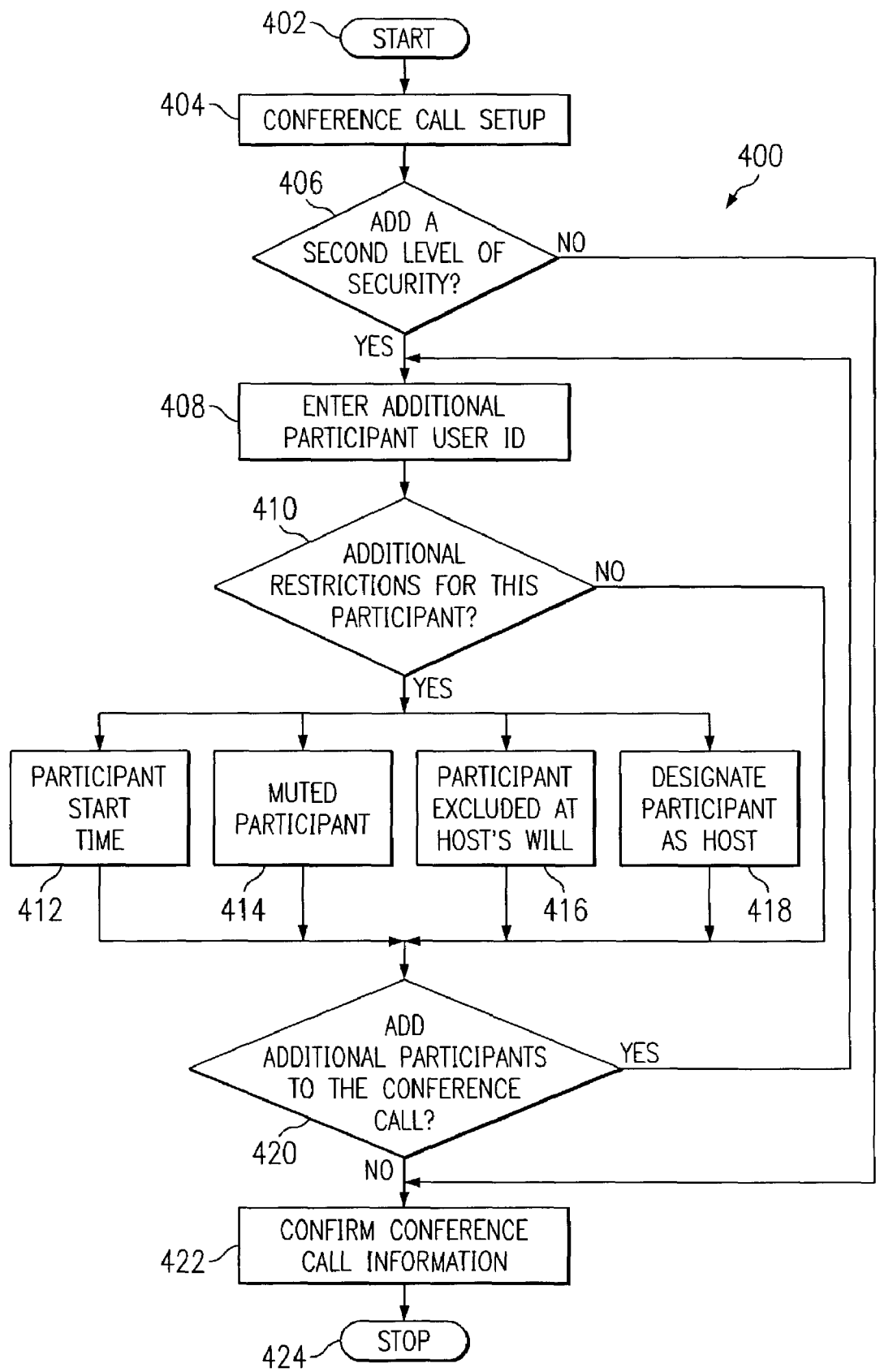
FIG. 4 is an illustration of the logic behind the host program.

FIG. 4 is a flowsheet of the logic behind host program 400. Host program 400 is used by the host of a conference call to set up the conference call, add a second level of security to the conference call, and restrict the participants' activity during the conference call. Host program 400 starts (402) when the host sets up the conference call (404). In setting up the conference call, the host acquires a conference call number and passcode from a third party conference calling center. Setting up a conference call in this manner is well known in the art. The host then makes a determination of whether he desires to add a second level of security to the conference call (406). If the host determines that he does not desire to add a second level of security to the conference call, then host program 400 confirms the conference call information (422) and host program 400 ends (424).

If at step 406 the host decides that he desires to add a second level of security to the conference call, then host program 400 proceeds to step 408 where the host enters a participant user ID (408). The participant user ID can be something as simple as a participant's name, or can be a more complex combination of alphanumeric characters. The passcode is another alphanumeric sequence known only to the participant, and optionally, to the host. The host may also have the option of selecting the participant user IDs from a database stored at the conference calling center or on the Internet. Alternatively, the host can send the participant user ID and passcode (if known) to the conference calling center at any time before or during the conference call. Moreover, the participants may call into the conference calling center and supply and/or edit their user ID and passcode.

After supplying the participant's user ID, host program 400 proceeds to step 410 where the host may restrict the extent of the participant's participation in the conference call (410). At this level, the host has four options to restrict the participant's participation in the conference call.

The first option is to set the participant's start time (412). In some circumstances, it may be desirable to exclude the participant from the conference call until a certain point or time. In these instances, the present option is appropriate. The host can set a specific time (i.e. 3:30 EST) for the participant to join into the conference call. Alternatively, the host can exclude the participant from the conference call until the host indicates that the participant is allowed to participate in the conference call. The indication of participant allowance into the conference call can be via a key on a touch tone telephone, the Internet, voice, or any other means preferable to the host.

The second option is to mute the participant (414). In some circumstances, it may be desirable for the participant to eavesdrop on the conference call. In other words, the participant can hear the conference call but is not allowed to speak during the conference call. This a useful option when a secretary is taking notes during a conference call and the other participants do not want to hear the secretary typing. In this option, the host can either mute the participant for the entire conference call, or indicate when the participant is to be muted by use of a key on a touch tone telephone, the Internet, by voice, or any other means preferable to the host.

Additionally, the host can make the participant muted with respect to only a select number of other participants. This is a useful option if the host wants to be able to hear the muted participant, but does not want any of the other participants to hear the muted participant. Again, the host can either mute the participant to the other participants for the entire conference call, or indicate when the participant is to be muted by use of a key on a touch tone telephone, the Internet, by voice, or any other means preferable to the host.

The third option is to exclude the participant at the host's will (416). In certain circumstances, it is desirable to exclude a conference call participant from the conference call for a given amount of time. This is useful in negotiation settings where the host is a representative of one of a plurality of parties attending a conference call and would like to confer with his client alone. It is also useful in mediation and arbitration settings where the host is the arbitrator or mediator and needs to talk to each party alone at different points throughout the conference call. In this option, the host can indicate when the participant is to be excluded by use of a key on a touch tone telephone, the Internet, by voice, or any other means preferable to the host.

The fourth option is to designate the participant as the conference call host (418). In certain circumstances, the party acting as host for the purposes of setting up the conference call may not necessarily be the same party who will be the host during the conference call. This is usually the case when a secretary or junior member of an organization is setting up the conference call, but a more senior member of the organization will be the host during the conference call. In this case, the host for the purposes of setting up the conference call can designate another party to be host when the conference call starts. The host may select one or a plurality of options 412 through 418.

After the host has selected the applicable options in steps 412 through 418, host program 400 proceeds to step 420 where the host makes a determination whether he desires to add another participant to the conference call (420). If the host desires to add another participant, host program 400 returns to step 408. If the host does not desire to add any more participants, host program 400 confirms the conference call information (422) and ends (424).

Figure 5:
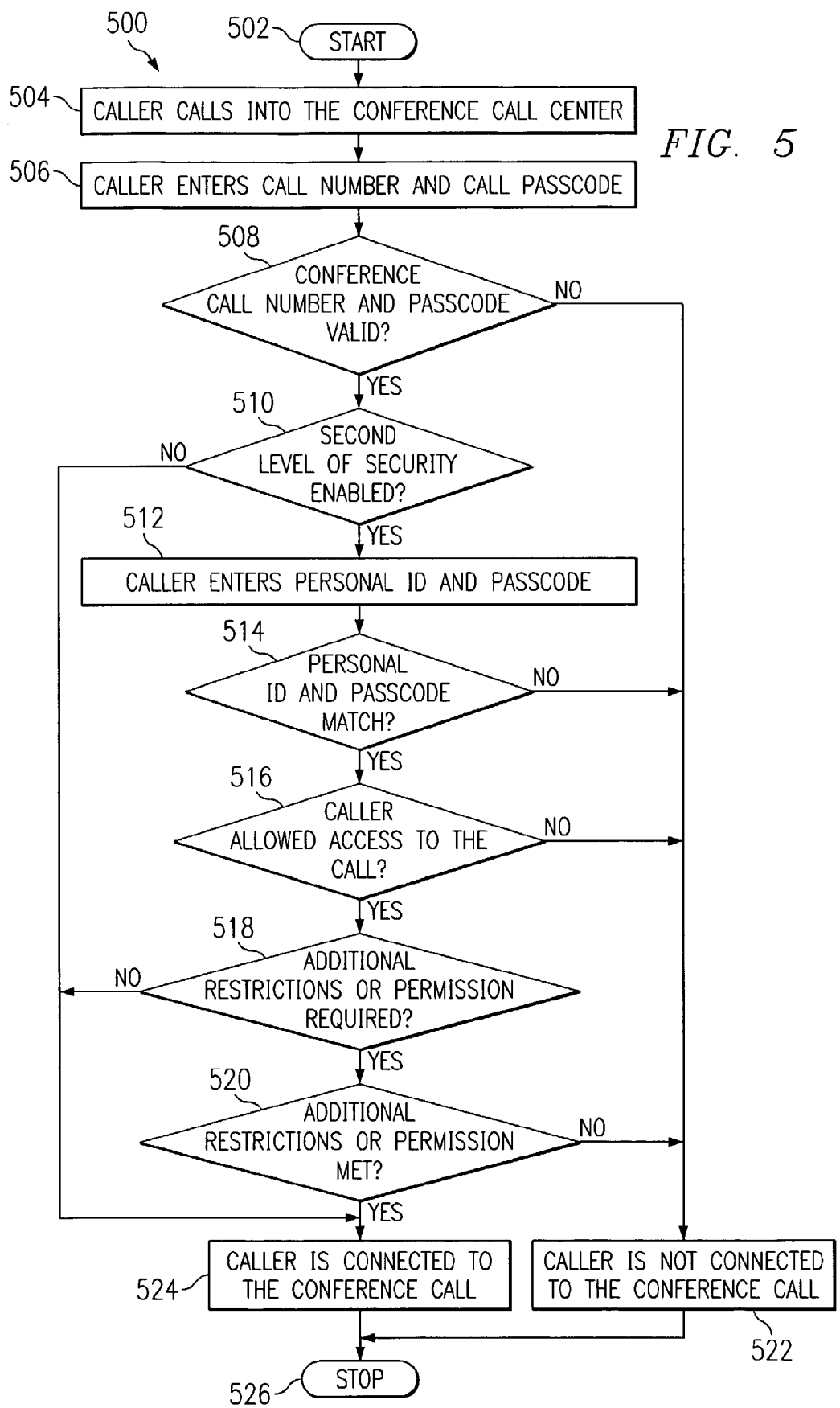
FIG. 5 is an illustration of the logic behind the caller program.

In a typical conference call, the host sets up the conference call in host program 400 and then the callers call into the conference call center initiating caller program 500. FIG. 5 is a flowsheet of the logic behind caller program 500. Caller program 500 starts (502) when a caller calls into the conference call center (504). The caller enters the call number and passcode for the conference call (506).

The conference call number and passcode should be differentiated from the conference call participant's user ID and passcode. The host gives the conference call number and passcode to the people he wants to participate in the conference call. The conference call number and passcode are then used to gain access to the conference call after a caller has called into the conference call center. Conversely, the personal user ID and passcode are used to specifically identify the particular caller. Although they may be acquired by the host, the user ID and passcode are specific to the participant (i.e. each person will have their own user ID and passcode) while the conference call number and passcode are conference call specific (i.e. each conference call will have its own call number and passcode). The user ID and passcode assigned to a particular person does not change from conference call to conference call.

The conference calling center then makes a determination of whether the conference call number and passcode are valid (508). If the conference call number and passcode are not valid, then the caller is not connected to the conference call (522) and caller program 500 ends (526). If at step 508 the conference call number and passcode are valid, then caller program 500 proceeds to step 510 where caller program 500 makes a determination of whether a second level of security is enabled for the conference call (510). If a second level of security is not enabled, the caller is connected to the conference call (524), and caller program 500 ends (526). If at step 510 a second level of security is enabled, then caller program 500 prompts the caller to enter their user ID and passcode (512). Caller program 500 then makes a determination of whether the caller's user ID and passcode match a user ID and passcode stored in the conference call center database (514). If the caller's user ID and passcode do not match, then the caller is not connected to the conference call (522) and caller program 500 ends (526). If at step 514 the caller's user ID and passcode match a database entry, then caller program 500 makes a determination of whether the caller is authorized to participate in the conference call (516). If the caller is not authorized to participate in the conference call, then the caller is not connected to the conference call (522) and caller program 500 ends (526). If at step 516 the caller is authorized to participate in the conference call, caller program 500 makes a determination of whether there are additional restrictions placed on the caller or whether the caller has to have permission to participate in the conference call (518). If there are no additional restrictions or permission required, then caller program 500 connects the caller to the conference call (524) and caller program 500 ends (526). If at step 518, there are additional restrictions or permission placed on the caller, then caller program 500 makes a determination of whether the criteria for the additional restrictions or permission is met (520). These criteria are the restrictions placed upon the participant by the user in steps 412 through 418 of host program 400. Fulfillment of some of the criteria may depend upon input from the host during the conference call (i.e. when the host has to enter input to allow the participant access to the conference call as described in step 412). If the criteria for the additional restrictions or permission are met, then the caller is connected to the conference call (524) and caller program 500 ends (526). If at step 520 the additional restrictions or permission is not met, then the caller is not connected to the conference call (522) and caller program 500 ends (526).

The present invention is an improvement on an existing conference call center automated connection system. The present invention is preferable over existing security devices because it allows the host of a conference call to verify that only authorized persons are participating in the conference call, but still allows the conference call participants the flexibility of connecting to the conference call from whatever telephone they prefer. The present invention also allows the host of a conference call to selectively exclude certain participants of the conference call. As such, the present invention will be located in the memory of the system in which the conference call center's automated connection computer program is located.

Figure 6A:
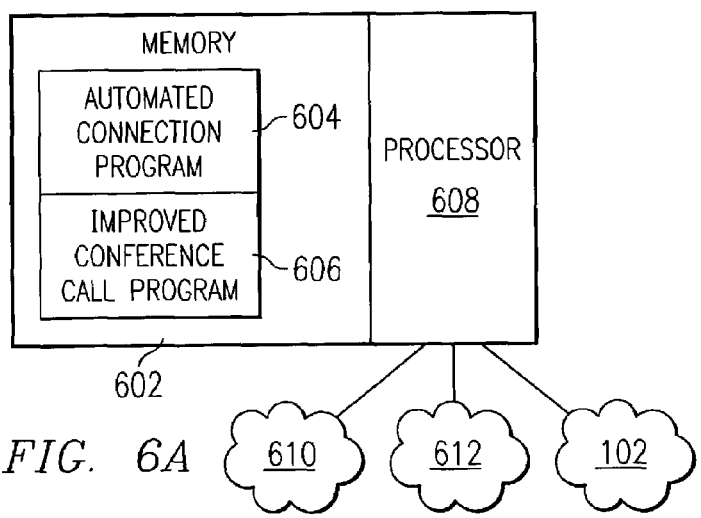
FIGS. 6A and 6B are block diagrams of the software of the present invention located in the memory of a telecommunications system.
Figure 6B:
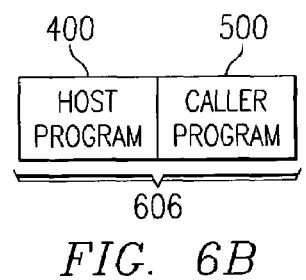

FIG. 6 is an illustration of the memory 602 of the system on which the conference call center's automated connection program 604 is implemented. Improved conference call program 606 comprises host program 400 and caller program 500 and is an addition to automated connection program 604. Memory 602 is a storage facility for data for processor 608. Processor 608 can interface with cellular networks 610, traditional non-cellular networks 612, or the Internet 102. Memory 602 and processor 608 can be a part of a system of a cellular service provider, a traditional non-cellular telecommunications system, or any other system which contains a conference call center's automated function program.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Additionally, the steps of the present invention need not be implemented in the order disclosed herein. The novel spirit of the present invention is still embodied by reordering or deleting some of the steps contained in this disclosure. The spirit of the invention is not meant to be limited in any way except by proper construction of the following claims.

What is claimed is:

1. An apparatus for connecting a participant to a conference call, the apparatus comprising:
a computer connected to an automated conference calling system;
a memory connected to the computer;
a program in the memory of the computer;
wherein the program causes the computer to allow the participant to access a conference call on the automated conference calling system only if the participant first enters a conference identification and a conference passcode, and then enters a correct participant identification and a correct participant passcode.

2. The apparatus of claim 1 wherein the program causes the computer to identify a participation restriction associated with the conference call, the participant identification, and the participant passcode; and to enforce the participation restriction.

3. The apparatus of claim 2 wherein said participation restriction is an exclusion of the participant until a certain time.

4. The apparatus of claim 2 wherein said participation restriction is the exclusion of the participant until a receipt of an input from a conference call host.

5. The apparatus of claim 2 wherein said participation restriction is the muting of said participant.

6. The apparatus of claim 2 wherein said participation restriction is the temporary exclusion of said participant based upon an input from a conference call host.

7. The apparatus of claim 2 wherein said participation restriction is the designation of said participant as a conference call host.

8. The apparatus of claim 2 wherein said program causes the computer to determine whether said participant identification and said participant passcode are the correct participant identification and the correct participant passcode by matching the participant identification and the participant passcode to a first entry and a second entry in a conference calling center database.

9. The apparatus of claim 2 wherein said program causes the computer to determine whether to place a restriction on said participant.

10. The apparatus of claim 9 wherein said program causes the computer to determine whether a criterion defining said restriction has been fulfilled.

11. A method of excluding a participant from a conference call, the method comprising:
using an automated conference calling system and a computer connected to the automated conference calling system, specifying a participant identification and a participant passcode for a participant in the conference call;
specifying a plurality of participation restrictions associated with said participant identification and said participant passcode;
connecting said participant to the conference call only if said participant first provides a conference identification number and a conference passcode, and then provides a correct participant identification, and a correct participant passcode; and excluding said participant from said conference call based on said participation restrictions.

12. The method of claim 11 wherein said participation restriction is an exclusion of the participant until a certain time.

13. The method of claim 11 wherein said participation restriction is an exclusion of the participant until a receipt of an input from a conference call host.

14. The method of claim 11 wherein said participation restriction is a muting of said participant.

15. The method of claim 11 wherein said participation restriction is a temporary exclusion of said participant based upon an input from a conference call host.

16. The method of claim 11 wherein said participation restriction is a designation of said participant as a conference call host.

17. A method of connecting an authorized participant to a conference call, the authorized participant being identified by a participant identification and a participant passcode, the method comprising:
responsive to a participant calling into a conference call center;
prompting the participant to enter a conference identification pertaining to said conference call;
prompting the participant to enter a conference passcode; responsive to the participant entering a correct conference identification and a correct conference passcode, prompting the participant to enter the participant identification;
prompting the participant to enter the participant passcode pertaining to the authorized participant; and
responsive to the participant entering a correct participant identification and a correct participant passcode, allowing the participant access to the conference call.

18. The method of claim 17 further comprising making a determination of whether said participant identification and said participant passcode are the correct participant identification and the correct participant passcode by matching a first entry and a second entry in a conference calling center database.

19. The method of claim 17 further comprising making a determination of whether a restriction is placed on said participant.

20. The method of claim 19 further comprising making a determination of whether a criterion defining said restriction has been fulfilled.

21. An apparatus for excluding a participant from a conference call, the apparatus comprising:
programmable hardware connected to a programmable able hardware readable medium and to an automated conference calling system; and
software encoded and stored on a programmable hardware readable medium containing instructions to cause the programmable hardware to perform the following:
associate participation restrictions with a participant identification;
connect said participant to the conference call only if the participant provides a correct conference identification number, a correct conference passcode, a correct participant identification and a correct participant passcode; and
exclude said participant from said conference call based on said participation restrictions.

22. The apparatus of claim 21 wherein said participation restriction is an exclusion of the participant until a certain time.

23. The apparatus of claim 21 wherein said participation restriction is an exclusion of the participant until receipt of an input from a conference call host.

24. The apparatus of claim 21 wherein said participation restriction is a muting of said participant.

25. The apparatus of claim 21 wherein said participation restriction is a temporary exclusion of said participant based upon receipt of an input from a conference call host.

26. The apparatus of claim 21 wherein said participation restriction is a designation of said participant as a conference call host.

27. An apparatus for connecting a participant to a conference call, the apparatus comprising:
programmable hardware connected to a programmable hardware readable medium;
software encoded and stored on the programmable hardware readable medium containing instructions to cause the programmable hardware to connect the participant to the conference call only if the participant first enters a conference identification and a conference passcode, and then enters a correct participant identification and a correct participant passcode.

28. The apparatus of claim 27 wherein said software directs said programmable hardware to make a determination of whether said participant identification and said participant passcode are the correct participant identification and the correct participant passcode by matching a first entry and a second entry in a conference calling center database.

29. The apparatus of claim 27 wherein said software directs said programmable hardware to make a determination of whether a restriction is placed on said participant.

30. The apparatus of claim 29 wherein said software directs said programmable hardware to determine whether a criterion defining said restriction has been fulfilled.

31. A apparatus for securing a conference call comprising:
means for specifying a participant in said conference call;
means for specifying a plurality of participation restrictions associated with said participant;
means for connecting said participant to said conference call;
means for excluding said participant from said conference call based on said participation restrictions;
means for calling into a conference call center,
means for entering a conference identification and a conference passcode pertaining to said conference call; and means for entering a participant identification and a participant passcode pertaining to said participant;

wherein the participant is allowed to access the conference call only when said participant enters the conference identification, the conference passcode, a correct participant identification, and a correct participant passcode.

32. The apparatus of claim 31 wherein a participation restriction is an exclusion of the participant until a certain time.

33. The apparatus of claim 31 wherein a participation restriction is an exclusion of the participant until receipt of an input from a conference call host.

34. The apparatus of claim 31 wherein said participation restriction is a muting of said participant.

35. The apparatus of claim 31 wherein said participation restriction is a temporary exclusion of said participant based upon a receipt of an input from a conference call host.

36. The apparatus of claim 31 wherein said participation restriction is the designation of said participant as a conference call host.

37. The apparatus of claim 31 further comprising means for making a determination of whether said participant identification and said participant passcode are the correct participant identification and the correct participant passcode by matching a first entry and a second entry in a conference calling center database.

38. The apparatus of claim 31 further comprising means for making a determination of whether a restriction is placed on a participant.

39. The apparatus of claim 38 further comprising means for making a determination of whether a criterion defining said restriction has been fulfilled.

40. A computer implemented method to secure a conference call having a conference identification and a conference passcode, comprising: using a computer, performing following series of steps:

specifying a participant identification and a participant passcode for a participant in the conference call;

specifying a plurality of participation restrictions for said participant, wherein the plurality of participation restrictions are selected from the group consisting of a restricted start time, a muted participation, and a selective exclusion;

receiving a call from said participant;

receiving a first identification and a first passcode pertaining to said conference call;

determining if the first identification matches the conference call identification;

determining if the first passcode matches the conference call passcode;

receiving a second identification and a second passcode pertaining to said conference call;

determining if the second identification matches the participant identification;

determining if the second passcode matches the participant passcode;

connecting said participant to the conference call only if the first identification matches the conference call identification, the first passcode matches the conference call passcode, the second identification matches the participant identification, and the second passcode matches the participant passcode; and enforcing the participation restrictions specified for the participant while the participant is connected to the conference call;

whereby securing a conference call having a conference identification and a conference passcode is accomplished.

* * * * *